July 12, 1927.

A. O. ABBOTT, JR 1,635,242

TIRE SHAPING APPARATUS

Filed July 30, 1926

INVENTOR:-
Adrian O. Abbott, Jr.
BY
Ernest Hopkinson
ATTORNEY

Patented July 12, 1927.

1,635,242

UNITED STATES PATENT OFFICE.

ADRIAN C. ABBOTT, JR., OF DETROIT, MICHIGAN, ASSIGNOR TO MORGAN & WRIGHT, OF DETROIT, MICHIGAN, A CORPORATION OF MICHIGAN.

TIRE-SHAPING APPARATUS.

Application filed July 30, 1926. Serial No. 125,932.

This invention relates generally to the manufacture of tires and more particularly to an apparatus for shaping a green band or carcass into approximately tire form preliminary to its vulcanization.

It has been found desirable for many reasons to manufacture tires by a so-called "pulley-band" process, in which the constituent parts, rubber composition and bead members are assembled in juxtaposition on a building drum whose surface is flat in a transverse direction and preferably cylindrical. Such tire bands after building may be, and have been, variously shaped. In my Patent No. 1,507,563, granted September 9, 1924, is disclosed an apparatus for utilizing a vacuum, or rather partial vacuum, to effect their shaping. This invention aims to provide a new and improved type of such vacuum shaping apparatus, and in particular to simplify and speed up the process of manufacturing tires therewith.

The present application is a continuation in part of my prior application Serial No. 708,838, filed April 25, 1924, and reference may be had thereto for a more full description of the apparatus and method of operating the same.

With the illustrated embodiment in mind and without intention to limit more than is required by the prior art, the invention, briefly stated, consists in providing extensions or skirts on the side of the vacuum chamber or chest of any suitable size and shape, which extensions or skirts are adapted to maintain a sealing engagement with the edges or beads of the band as it is progressively drawn into the vacuum chamber by exhausting the air therefrom.

Further objects and advantages of the present invention will be better understood by reference to the following specification when considered in connection with the accompanying drawings illustrating a selected embodiment thereof, in which:—

Figure 1:
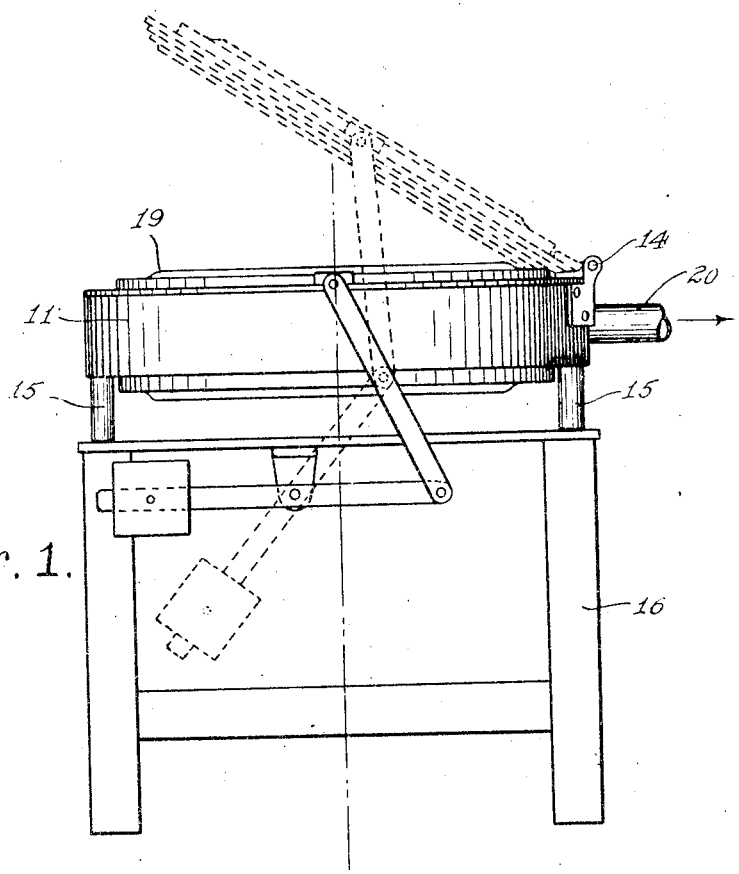
Figure 1 is an elevation of apparatus illustrating the principles of the invention.

Referring to the drawings, the apparatus is shown to comprise a vacuum chamber 10 consisting of an outer wall 11, (which may be made adjustable as disclosed in said prior Patent No. 1,507,563), a bottom wall 12 and a top wall 13. In the present embodiment the top wall 13 is hingedly connected to the outer wall 10 at 14 and forms a cover member. The vacuum chamber may be supported in any convenient manner, as for example upon short legs 15 resting on or attached to a suitable stand 16. The proportions and shape of the vacuum chamber may, of course, be varied but it is desirable to make the outer wall 11 of a diameter somewhat larger than the tread portion of the casing in order to permit of subsequently positioning therein a curing bag (not shown) without buckles or wrinkles. The inner edges of the walls 12 and 13 are preferably made slightly greater in diameter than the beads of the band or casing 17 so that the latter may be introduced with ease and facility. The width between the walls 12 and 13 is preferably made about as shown so as to allow the curing bag to be introduced readily, the edges of the casing not coming into contact with the inner edges of the top and bottom walls until the tire has been drawn nearly to shape. Generally, the chamber may be described as U-shaped in cross-section or of non-collapsible formation and of a size adapted to receive a substantially shaped casing.

In the present invention the vacuum chamber 10 is provided with extensions or skirts 18 and 19 on the bottom and top walls, respectively. As was set forth fully in my earlier application 708,838, these extensions or skirts may be either flexible or rigid, but in the present embodiment only the rigid form is illustrated. These extensions or skirts 18 and 19 may be secured substantially air-tightly to the outer surfaces of the plates or walls 12 and 13, respectively, in any suitable manner, or they may be integral therewith. The spacing of the extensions or skirts is preferably greater than the width of the chamber but their inner diameter is preferably less than the inner diameter of the top and bottom walls 12 and 13, and about as shown in the drawings, in order to afford an initial seal with the pulley band when differential pressures are developed on opposite sides of the casing, with which casing the inner margins of the extensions or skirts 18—19 engage intermediately, i. e., away from the beaded portions of the casing, at the commencement of a shaping treatment.

Figure 2:
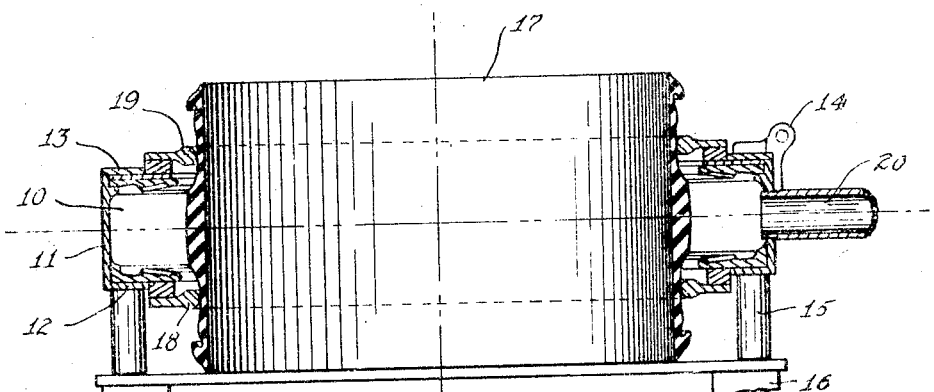
Figure 2 is a central vertical section of the apparatus with a pulley-band positioned therein prior to the expanding operation.
Figure 3:
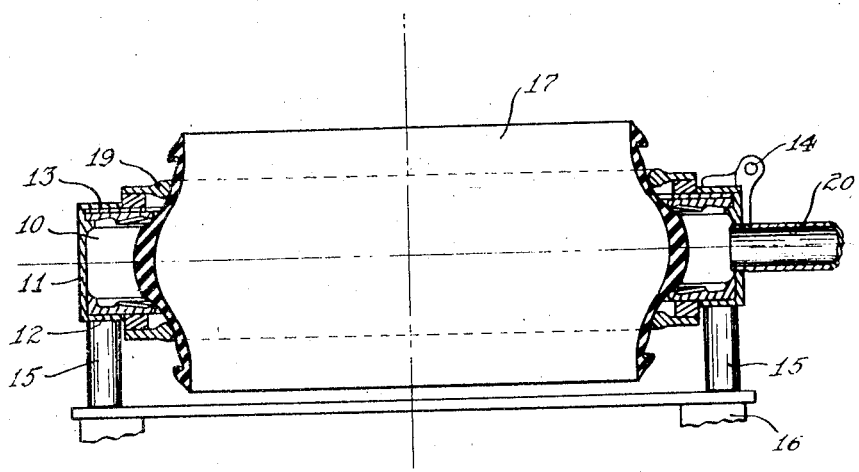
Figure 3 is the same as Figure 2, except that the pulley-band is partially expanded.
Figure 4:
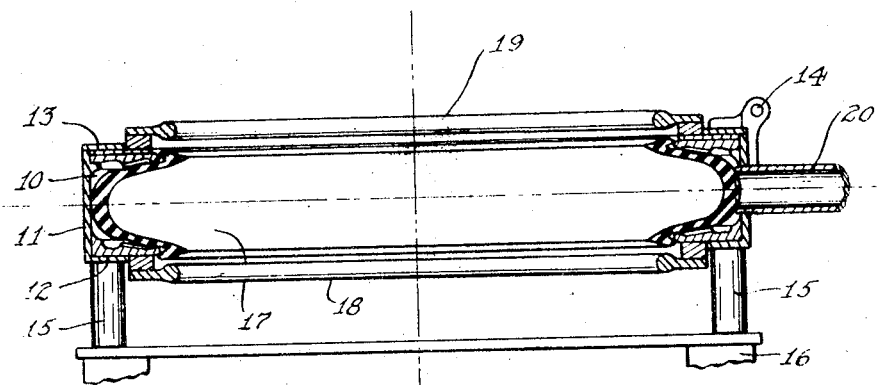
Figure 4 is the same as Figure 2, except that the pulley-band is completely expanded and ready for the application of a curing bag.

In operation, the casing 17 is introduced into position as shown in Figure 2, this being readily accomplished owing to the more or less pliable nature of the band. The air in the vacuum chamber is then exhausted through the pipe 20 communicating with any suitable vacuum producing apparatus (not shown). It will be noted that the outer face of the band is initially in contact with the edges of the extensions or skirts 18 and 19 and thus the vacuum chamber is sealed by this contract. The exhaustion of the air in the vacuum chamber causes the casing 17 to be drawn outwardly through the successive stages illustrated in Figures 3 and 4. When this expansion of the casing has progressed to the stage indicated in Figure 3 the casing has been brought into contact with the inner edges of the plates 18 and 19. The initial or primary seal is provided by the inner edges of the extensions or skirts 18 and 19, as has been described. The contacting of the pulley-band with the inner edges of the plates or walls 12 and 13 provides the secondary or final seal of the chamber. Thus it will be seen that in the apparatus of the present invention means are provided for successively engaging and sealing the casing during its shaping to approximate tire form.

With the apparatus of the present invention the operation of shaping the tire may be performed with great rapidity, practically instantaneously. The operator does not have to stand idle waiting for movement to a non-obstructing position of such auxiliary parts as are shown and described in my patent previously referred to. In other words, tires may be manufactured with the apparatus of the present invention as fast as the operator can work. These and other advantages will be apparent to those skilled in the art.

This application comprehends not only the form of apparatus illustrated in the drawings but also all forms of the apparatus disclosed in my aforesaid prior application, Serial No. 708,838, filed April 25, 1924, in which there are provided lateral extensions or skirts of a width roughly approximating the width of the casing before it is shaped in the apparatus.

Of course, various changes and modifications may be made in the details of construction of the apparatus, the specific embodiment herein described being merely illustrative. The invention is not intended to be limited, except as hereinafter pointed out in the appended claims to which reference should be made for a full and complete understanding of the scope of the invention. In the claims the reference to top and bottom plates of the vacuum chamber being "relatively fixed" is used to define their relation during any one shaping operation of a casing to differentiate from collapsible vacuum chambers of the prior art, such as disclosed in the patent to Sloper, No. 1,487,054, March 18, 1924, and is not intended to exclude adjustment of the apparatus to accommodate pulley bands of different width such as disclosed in my Patent No. 1,507,563, September 9, 1924, Figs. 13–16 inclusive, nor to exclude provision for opening the vacuum chamber to remove a casing after shaping such as afforded by hinging the top wall of the vacuum chamber as illustrated at 14.

Having thus described my invention what I claim and desire to protect by Letters Patent is:—

1. A tire shaping apparatus comprising a hollow annular chamber having relatively fixed top and bottom walls on the inner edges of which a casing is adapted to be finally sealed, said inner edges being of a diameter greater than the bead-diameter of the casing which is to be shaped, means for exhausting air from the chamber, and initial sealing means supported in proximity to and of smaller internal diameter than said inner edges of the chamber.

2. A tire shaping apparatus comprising a hollow annular chamber having relatively fixed top and bottom walls on the inner edges of which a casing is adapted to be finally sealed, said inner edges being of a diameter greater than the bead-diameter of the casing which is to be shaped, means for exhausting air from the chamber, and initial sealing members supported by the chamber and of smaller internal diameter than said inner edges of the chamber.

3. A tire shaping apparatus comprising a hollow annular chamber having relatively fixed top and bottom walls on the inner edges of which a casing is adapted to be finally sealed, said inner edges being of a diameter greater than the bead-diameter of the casing which is to be shaped, means for exhausting air from the chamber, and initial sealing members located on the outside of said top and bottom walls and of a diameter internally approximately equal to the diameter of the beaded portions of the pulley band casing.

4. A tire shaping apparatus comprising a hollow annular chamber having relatively fixed top and bottom walls on the inner edges of which a casing is adapted to be finally sealed, said inner edges being of a diameter greater than the bead-diameter of the casing which is to be shaped, means for exhausting air from the chamber, and initial sealing members located on the outside of said top and bottom walls and having an internal diameter less, and being spaced apart a greater distance, than said inner edges of the chamber.

5. A tire shaping apparatus comprising a hollow annular chamber having relatively fixed top and bottom walls on the inner edges of which a casing is adapted to be finally sealed, said inner edges being of a diameter greater than the bead-diameter of the casing which is to be shaped, means for exhausting air from the chamber, and initial sealing members secured externally of the chamber in proximity to its said inner edges, said initial sealing members being of less diameter internally than the inner edges of the chamber and being spaced from each other a distance less than the distance between the beaded portions of the casing to be shaped.

6. A tire shaping apparatus comprising a hollow annular chamber having relatively fixed top and bottom walls on the inner edges of which a casing is adapted to be finally sealed, said inner edges being of a diameter greater than the bead-diameter of the casing which is to be shaped, means for exhausting air from the chamber, and rigid initial sealing members supported on the outside of the chamber and of smaller internal diameter than the inner edges of the chamber for sealing engagement with the casing during shaping treatment.

7. A tire shaping apparatus comprising a non-collapsible hollow annular chamber having its inner periphery open and of a diameter greater than the bead-diameter of the casing to be shaped therein, initial sealing members supported in proximity to and of a smaller diameter than the inner periphery of the annular chamber for engagement with the casing during its shaping treatment, and means for exhausting air from the hollow annular chamber to shape the casing.

8. A tire shaping apparatus comprising a non-collapsible hollow annular chamber having its inner periphery open and of a diameter greater than the bead-diameter of the casing to be shaped therein, initial sealing members supported in proximity to and of a smaller diameter than the inner periphery of the annular chamber for engagement with the casing during its shaping treatment, and means for exhausting air from the hollow annular chamber to shape the casing, said members being spaced apart a less distance than the beaded portions of the pulley band to be shaped therein.

Signed at Detroit, in the county of Wayne and State of Michigan, this 26th day of July, 1926.

ADRIAN O. ABBOTT, Jr.